United States Patent [19]
Kearney

[11] 3,897,206
[45] July 29, 1975

[54] METHOD OF PREPARING CELLULOSIC TEXTILE MATERIALS HAVING IMPROVED SOIL RELEASE AND STAIN RESISTANCE PROPERTIES

[75] Inventor: John A. Kearney, Macon, Ga.

[73] Assignee: The Bibb Company, Macon, Ga.

[22] Filed: Dec. 27, 1972

[21] Appl. No.: 318,858

[52] U.S. Cl. ........ 8/120; 117/139.5 A; 117/161 UZ
[51] Int. Cl. ............................................. D06m 13/00
[58] Field of Search ...... 8/120, 115.6; 117/139.5 A, 117/161 UZ

[56] References Cited
UNITED STATES PATENTS

| | | | |
|---|---|---|---|
| 3,409,386 | 11/1968 | Bloch et al. | 8/120 X |
| 3,493,319 | 2/1970 | Berni et al. | 8/120 |
| 3,535,308 | 10/1970 | Schaefer et al. | 8/120 |
| 3,540,835 | 11/1970 | Marco | 8/115.6 |
| 3,575,960 | 4/1971 | Tesoro | 8/120 X |
| 3,617,201 | 11/1971 | Berni et al. | 8/120 |

Primary Examiner—Stephen J. Lechert, Jr.
Attorney, Agent, or Firm—Cushman, Darby & Cushman

[57] ABSTRACT

Cellulosic textile materials having improved soil release and stain resistance properties are obtained by impregnation with an ethylene-maleic anhydride copolymer or an ethylene-maleic acid copolymer and drying and curing the resulting impregnated product. The procedure is applicable to fibers, yarns and manufactured cloths of various hydroxyl-containing polymers such as cotton, cotton-containing materials and blends of cellulosic materials with various synthetics such as polyesters.

15 Claims, No Drawings

METHOD OF PREPARING CELLULOSIC TEXTILE MATERIALS HAVING IMPROVED SOIL RELEASE AND STAIN RESISTANCE PROPERTIES

BACKGROUND OF THE INVENTION

This invention relates to improvements in the treatment of fibrous materials. More particularly, it relates to a method of impregnating textile fabrics, fibers and yarns with an ethylene-maleic anhydride copolymer or an ethylene-maleic acid copolymer so as to impart soil release and stain resistance properties thereto.

Permanent press fabrics are well known in the art, and the textile industry is constantly striving to improve the properties thereof. One of the main considerations in this regard is to provide textile fabrics which are resistant to stains and soil, especially of an oily nature. Such properties are particularly desired in cellulosic-type materials, as best exemplified by cotton.

From a chemical point of view, it is believed that cotton is predominantly cellulose. The generally accepted concept of the chemical constitution of cellulose is that it comprises a natural high polymer with an anhydride of glucose as its basic building block or unit. Aside from natural changes and reactions which alter the cellulose structure to some degree, i.e., esterification with natural acids, hydrogen bonding, etc., the basic cellulose chain molecule occurring in cotton may be depicted as follows:

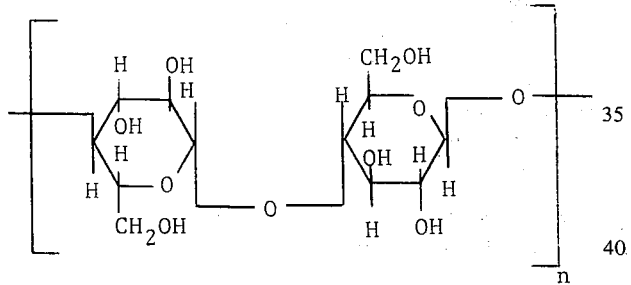

Examination of this structure shows one primary hydroxyl group in the 6-position and two secondary hydroxyl groups in the 2-and 3-positions. In addition, the end groups in each chain contain a secondary hydroxyl group in the 4-position. The latter hydroxyl groups react typically as usual hydroxyl groups, although they are subject to structural conditions, steric hindrance and the like.

As a result of a great amount of research which has been carried out on cotton, it has been found that the hydroxyl groups do, in fact, react typically, but, depending upon the reaction conditions, the polymer chain is also attacked and changed drastically. This is clearly illustrated in connection with the production of rayon and in the so-called "tendering" of cotton cloth when it is subjected to treatment with, for example, maleic acid. As is well known in the art, tendering is the reduction in tensile strength of a fibrous yarn or cloth resulting from the breakdown of the links in the polymer chain.

Various materials have been added to cellulosic fabrics to improve the properties thereof, such as crease-resistance, resistance to shrinkage, light fastness, soil resistance and the like. Varying degrees of success have been obtained in such procedures. However, it is important that the impregnant used does not reduce the tensile strength of the material or adversely affect any of the important properties thereof.

One of the primary objects of the present invention is to provide cellulosic materials having an improved soil release and stain-resistance property.

Another object of the invention is to provide a method for imparting soil resistance to textile materials which may be carried out efficiently and effectively in an economical manner without adversely affecting the properties or characteristics thereof.

A further object of the invention is to provide permanent press textile materials having various desirable excellent properties, including good hand, soil release and stain resistance qualities.

These and other objects and advantages of the present invention will become apparent to those skilled in the art from a consideration of the following specification and claims.

SUMMARY OF THE INVENTION

In accordance with the present invention, it has been found that the above objectives and others may be attained by impregnating cellulosic-type materials with an ethylene-maleic anhydride or ethylene-maleic acid copolymer resin. Basically, this invention involves the reaction of the free hydroxyl groups of the cellulose chain in the presence of an esterification catalyst.

The ethylene-maleic anhydride resins utilized in the present invention contain the following typical recurring unit in the polymer chain:

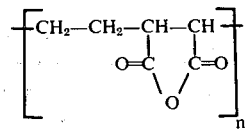

Materials of this type are commercially available, for example, the ethylene-maleic anhydride resins marketed by Monsanto under the trademark "EMA". Such resins are copolymers prepared by reacting ethylene with maleic anhydride. Although the above structure shows an anhydride linkage in the chain, it is also quite possible to produce the corresponding diacid derivative thereof. These copolymer resins can be utilized in the present invention in a wide range of molecular weights and in either linear or cross-linked form. Cross-linking of these copolymers is accomplished by reaction across the ethylene backbone of the polymer, resulting in extremely high molecular weights. The preferred ethylene-maleic anhydride or acid copolymers employed in connection with the present invention are linear and have a molecular weight corresponding to a viscosity of about 2.0 to about 5.0 centipoises [2% aqueous solution as measured at normal product pH]. Generally, however, copolymers having molecular weights of about 1000 to about 100,000 can be used advantageously in the process.

The ethylene-maleic anhydride or acid copolymers are odorless, tasteless, free-flowing white powders. They are not liquid. They dissolve in hot or cold water and in many organic solvents to give clear, smooth solutions. The viscosity of these solutions varies from a water-thin quality to heavier, molasses-like solutions, depending upon the molecular weight. Obviously, the lower viscosity solutions are preferred for impregnation of the textile materials in connection with this invention.

The procedure of the present invention generally comprises padding of a solution of the ethylene-maleic anhydride resin onto a cloth, yarn or fiber, drying, curing and, in some cases, after washing. From a practical point of view, the ethylene-maleic anhydride copolymer is usually dissolved in water to give an aqueous impregnating solution. In this case, the polyanhydride structure dissolves through hydrolysis to give the acid form which is highly soluble in water. An organic solvent solution thereof may also be employed for the padding step in this process. Polar organic solvents such as lower alcohols, for example, methanol, ethanol, propanol, or butanol, may be used advantageously as the organic solvent. It is also quite possible to apply the solution of ethylene-maleic anhydride resin to the textile material by means of a bath or by spraying. Typical esterification catalysts, such as p-toluene sulfonic acid, dodecyl benzene sulfonic acid and dilute sulfuric acid are advantageously employed to accelerate the reaction.

Drying of the material is conducted for approximately thirty seconds to one hour, depending upon the temperature and the type of cloth or material treated. The temperature used during the drying step ranges from air-drying at room temperature (70°–95°F.) to about 300°F. Usually, the time and temperature are inverse functions of each other. The curing temperatues range from approximately 310°F. to about 410°F. for time periods of from about 15 seconds to 5 minutes. Again, the time and temperature parameters are usually inverse functions of each other.

If desired, an after-wash step may be employed and seems to be beneficial in most cases in providing materials having a good hand. It is, of course, quite possible to include other treatments of the cloth of fibrous material in conjunction with the procedure of the present invention, including softening or hand improvement methods, separate or simultaneous treatments to provide better finish, appearance, etc.

As an example of such a separate or simultaneous treatment, good results have been obtained by first treating the material to impart wrinkle resistance thereto by techniques known in the art and, then achieving the soil release properties in accordance with the present invention by the impregnation and treatment with the ethylene-maleic anhydride copolymers. As noted above, the application of the ethylene-maleic anhydride or ethylene-maleic acid copolymers is particularly beneficial in conjunction with the application of a permanent press impregnant, either simultaneously or in separate treatment steps, to provide textile materials having excellent stain and soil resistance as well as permanent press properties.

A variety of other additives may also be included to effect useful properties or to eliminate unwanted properties from the materials. For example, the incorporation of from about 0.5 to 20% of additives such as ethylene glycol, glycerine, various latices and the like serves to improve the hand of the treated fabric.

The present invention is applicable to cellulose-containing materials, whether in the form of a manufactured cloth, fibers, yarn and the like. Fabrics made of cotton or blends of cotton and polyesters, for example, containing 50% of cotton and 50% of polyester, have been successfully treated in accordance with this invention. Moreover, the impregnation with the ethylene-maleic anhydride or acid resins for obtaining soil release properties may be used with any blends containing cotton, rayon or other cellulosics, regardless of the synthetic portion of the blend as well as with synthetic textile materials which contain free hydroxyl groups in their structure. So long as the material to be treated has such free hydroxyl groups, the present invention can be used to impart the desired properties thereto.

The ethylene-maleic anhydride resins are used in the impregnating solutions or baths in a concentration of from about 2 to 10% by weight and, as noted above, in varying molecular weights from relatively short chain lengths to high molecular weights. The only limiting factor in this regard appears to be the practical application of the resin to the material to be treated from the point of view of viscosity of the impregnating solution.

EXAMPLES OF THE INVENTION

The following examples are given merely as illustrative of the present invention and are not to be considered as limiting. Unless otherwise noted, the percentages therein and throughout the application are by weight.

EXAMPLE 1

A mixture comprising 100 grams of a 10% aqueous solution of EMA-21 (a linear ethylene-maleic anhydride copolymer having a viscosity of 5.0 centipoises for a 2% aqueous solution), 10 grams of a monoalkyl ($C_{15}$–$C_{20}$) ester of maleic anhydride, and 0.03 grams of p-toluene sulfonic acid (as the catalyst) was prepared and applied to white-type 190 goods at room temperature by padding at 40–45% pick-up, dried at 250°F. for 3 minutes and then cured at 320°F. for two minutes in a Despatch forced air dryer. The treated sample was then subjected to a wash and dry cycle testing to failure. This sample completed over 100 cycles before failure.

EXAMPLE 2

A mixture comprising the following materials was prepared:

| | | |
|---|---|---|
| Quick-Sett J-4 | 10 | g. |
| (a urea-formaldehydeyperesin used for permanent press properties) | | |
| EMA-21 (10% aqueous solution) | 50 | g. |
| Hycar latex | 5 | g. |
| (a polyacrylic ester elastomer) | | |
| p-toluenesulfonic acid | 0.03 | g. |
| Synthropol KB | 2 | g. |
| (an ethoxylated alcohol used as a penetrant) | | |
| Triton X-100 | 0.2 | g. |
| (an alkylaryl polyether alcohol surface active agent) | | |
| Water | 35 | g. |

This mixture was padded on white-type 190 cloth at 40–45% pick-up, dried at 250°F. for 3 minutes and cured at 330°F. for one minute. This specimen was subjected to the wash-dry cycle 82 times before failure.

EXAMPLE 3

A mixture of the following materials was prepared as an impregnating solution:

| | | |
|---|---|---|
| EMA-21 (10% solution) | 80 | g. |
| Hycar latex | 5 | g. |

EXAMPLE 3 — Continued

| | | |
|---|---|---|
| Dow XET4-0245 (dimethyl polysiloxane) | 4 | g. |
| Dow 182-A catalyst (organometallic catalyst) | 0.1 | g. |
| Dow T4-0149 (silanol, silane coupler) | 0.5 | g. |
| p-toluene sulfonic acid | 0.03 | g. |
| Triton X-100 | 0.1 | g. |
| Water | 10 | g. |

The above mixture was padded on white-type 190 cloth at 40-45% pick-up, the cloth was dried at 250°F. for 3 minutes, and it was then cured at 350°F. for 5 minutes. This sample exceeded more than 100 test wash-dry cycles before failure.

In a similar manner, various cotton and cotton-containing materials, fibers and yarns have been treated with impregnating solutions containing ethylene-maleic anhydride and ethylene-maleic acid copolymers to obtain materials having an excellent resistance to soil, particularly with regard to oily stains and the like, and which have a good hand and other desirable properties. These tests have been conducted within the parameters outlined above. While various modifications may be used in the specific procedures employed within the skill and knowledge of the art, depending upon the material being treated and the desired end properties thereof, the basic feature of obtaining good soil resistance by impregnation with an ethylene-maleic anhydride or acid copolymer in connection with this invention remains the same.

The invention being thus described, it will be obvious that the same may be varied in many ways. Such variations are not to be regarded as a departure from the spirit and scope of the invention, and all such modifications as may be apparent to those skilled in the art are intended to be included herein.

What is claimed is:

1. A process for producing cellulosic textile materials having improved soil release and stain resistance properties which comprises impregnating said textile material with a solution of an ethylene-maleic anhydride copolymer or an ethylene-maleic acid copolymer in the presence of an esterification catalyst to cause a reaction between the cellulosic material and the said copolymer; drying the impregnated material at from room temperature to about 300°F., and then curing the impregnated material at a temperature of about 310° to about 410°F.

2. The process of claim 1, wherein said textile material is cotton.

3. The process of claim 1, wherein said textile material is a blend containing cotton or rayon.

4. The process of claim 1, wherein said textile material is a blend containing cotton and a polyester.

5. The process of claim 1, wherein said textile material is in the form of a cloth or sheeting.

6. The process of claim 1, wherein said textile material is in the form of a fiber.

7. The process of claim 1, wherein said textile material is in the form of a yarn.

8. The process of claim 1, wherein the drying step is conducted for about 30 seconds to about 1 hour.

9. The process of claim 1, wherein the curing step is conducted for about 15 seconds to about 5 minutes.

10. The process of claim 1, further including the step of after-washing the cured textile material.

11. The process of claim 1, wherein said copolymer is a linear copolymer of ethylene and maleic anhydride having a viscosity as a 2% aqueous solution of about 2.0 to 5.0 centipoises.

12. The process of claim 1, wherein said copolymer has a molecular weight of about 1000 to about 100,000.

13. The process of claim 1, wherein a solution having a concentration of about 2 to 10% by weight of said copolymer is applied to the textile material.

14. The process of claim 1, wherein an aqueous solution of said copolymer is applied to the textile material.

15. The process of claim 1 wherein said copolymer is dissolved in water.

* * * * *